United States Patent [19]

Koslow

[11] Patent Number: 5,331,037
[45] Date of Patent: Jul. 19, 1994

[54] EXTRUDED SOLID COMPOSITE ARTICLES AND COMPOSITIONS FOR PRODUCING SAME

[75] Inventor: Evan E. Koslow, Weston, Conn.

[73] Assignee: Koslow Technologies Corporation, Orange, Conn.

[21] Appl. No.: 41,673

[22] Filed: Apr. 1, 1993

Related U.S. Application Data

[60] Division of Ser. No. 778,266, Oct. 17, 1991, Pat. No. 5,249,948, which is a continuation-in-part of Ser. No. 682,182, Apr. 8, 1991, Pat. No. 5,189,092.

[51] Int. Cl.⁵ .......................... C08K 3/04; C08K 3/22; C08K 5/09; B29D 23/00
[52] U.S. Cl. ..................... 524/496; 524/394; 524/431; 524/495; 524/484; 524/485; 524/486; 428/36.9; 428/323; 428/408
[58] Field of Search ............... 523/220, 221; 524/394, 524/431, 484, 485, 486, 490, 491, 495, 496; 428/36.4, 36.8, 36.9, 323, 408

[56] References Cited

U.S. PATENT DOCUMENTS

| | | | |
|---|---|---|---|
| 3,985,661 | 10/1976 | Ikeda et al. | 252/12 |
| 4,039,507 | 8/1977 | Paige et al. | 523/220 |
| 4,159,286 | 6/1979 | Khattab et al. | 523/220 |
| 4,737,539 | 4/1988 | Jinno et al. | 524/508 |
| 5,189,092 | 2/1993 | Koslow | 524/495 |
| 5,236,784 | 8/1993 | Kobayashi et al. | 428/408 |

FOREIGN PATENT DOCUMENTS 0008254  1/1982  Japan .................................. 523/220

*Primary Examiner*—Paul R. Michl
*Assistant Examiner*—Peter Szekely
*Attorney, Agent, or Firm*—Parmelee, Bollinger & Bramblett

[57] ABSTRACT

Extruded composite solid articles from feed mixtures comprising a substantially uniform mixture of particulate binder material and particulate primary material in which the feed mixture is forced through an extrusion die of substantially uniform cross-section and subject to heat, pressure and cooling which consolidates the feed mixture whereby it emerges from the die as a solid composite article and in which the pressure in the extrusion die is supplied by back-pressuring means external of the die. Solid filter elements of activated carbon particles for a wide variety of filtering applications may be formed.

14 Claims, 1 Drawing Sheet

EXTRUDED SOLID COMPOSITE ARTICLES AND COMPOSITIONS FOR PRODUCING SAME

RELATED APPLICATION

This application is a divisional of allowed application Ser. No. 07/778,266, filed Oct. 17, 1991, now U.S. Pat. No. 5,249,948, which is a continuation-in-part of application Ser. No. 07/682,182, filed Apr. 8, 1991, now U.S. Pat. No. 5,189,092, issued Feb. 23, 1993.

TECHNICAL FIELD

This invention relates to novel method and apparatus for the continuous extrusion of composite solid articles having a porous structure. Particulate binder material is mixed with particulate primary material to form a substantially uniform feed mixture. The feed mixture is forced through an extrusion die and subjected to heat, pressure, and cooling whereupon it emerges from the die as a solid article with a continuous profile.

In a more specific embodiment, solid filter elements are formed. These elements are porous tubes of a filtering medium such as, for example, activated carbon.

BACKGROUND ART

The closest known process and apparatus to that of this invention, is described in my U.S. Pat. No. 5,019,331, issued May 28, 1991 for "PROCESS FOR THE PRODUCTION OF MATERIALS AND MATERIALS PRODUCED BY THE PROCESS"; its parent application, U.S. Ser. No. 07/314,651, filed Feb. 23, 1989, now abandoned; its divisional application Ser. No. 07/571,075 filed Aug. 21, 1990, now U.S. Pat. No. 5,147,722, issued Sep. 15, 1992; and the references cited therein.

The above-mentioned U.S. Pat. No. 5,019,311 discloses the production of composite materials which are characterized by primary particles interconnected by a continuous web matrix or by forced point-bonds, resulting from the presence of a binder material. The process requires high pressures and sufficient shear that are only applied shortly after heating the powdered feed material. One of the production techniques disclosed in the referenced application is extrusion through a die. (Application Sec. VI C., D.).

It has since been discovered that a number of practical problems arise in attempting to practice die extrusion to produce such composite solid articles, for example, activated carbon filters. While actual production of such articles can be achieved, it is only with difficulty. One reason is that, in order to achieve the high pressures and shear required after the heating step, it has been necessary to employ what are called "compression" dies. These are dies with decreasing cross-sections and dies in which a cross-section thereof is smaller than the cross-section of the extruder screw in order to produce substantial back pressure. The replication of these dies is extremely difficult due to a number of critical design factors such as the surface finish of the die and the depth and location of steps within the die. As a result of the complex design of such dies, they are extremely difficult to replicate and are very expensive. Furthermore, the difficulty of achieving correct back pressure based upon the internal configuration of the die passage is very difficult, can not be sufficiently controlled by the extruder operator, and results in a substantial amount of scrap.

It is therefore an object of this invention to provide a process and apparatus for extruding composite solid articles which eliminate or substantially avoid these drawbacks and problems. A further object of this invention is to produce novel composite solid articles, such as certain activated carbon filters, employing the process and apparatus.

DISCLOSURE OF THE INVENTION

In accordance with the present invention, a substantially uniform feed mixture, similar to that employed in the aforementioned applications, is passed through a substantially cylindrical extrusion die having a cross-section not substantially smaller than the cross-section of the inside diameter of the extruder barrel, and preferably such die is a substantially cylindrical extrusion die having a constant cross-section which is most preferably substantially equivalent to the cross-section of the extruder barrel. Heat is applied to an inlet portion of the die to heat the feed mixture therein to a temperature substantially above, generally at least about 25° C. above, the softening point of the binder material, but less than the softening point of the primary material particles. Pressure, which can be at a much lower value than in my aforementioned prior application, is applied. Furthermore, the pressure is essentially externally controlled, such as through the use of externally controlled back pressure applied to the product being extruded from the die and optionally through controlled injection pressure of the feed mixture. A solid extruded composite solid product results when cooling is applied to the die following the heating step.

With the development of this improved process and apparatus of the present invention it has become possible to extrude composite solid articles from compositions not heretofore possible to successfully extrude, such as for example, certain activated carbon compositions extruded as porous filter elements.

DETAILS OF AND BEST MODE FOR CARRYING OUT THE INVENTION

As discussed above, a basic concept of this invention which distinguishes it from the disclosures of the aforementioned patent applications is that control of the physical parameters of the extrusion process, particularly back pressure in the extrusion die, is essentially removed from the die and relegated to machines or apparatus outside the die. In addition, the current invention allows a better product with improved porosity, strength, and aesthetics to be produced under controllable low-pressure conditions. Pressure can be accurately regulated to prevent undue crushing of very soft or fragile particles such as, for example, those of relatively large sized activated carbon particles.

Figure 1:
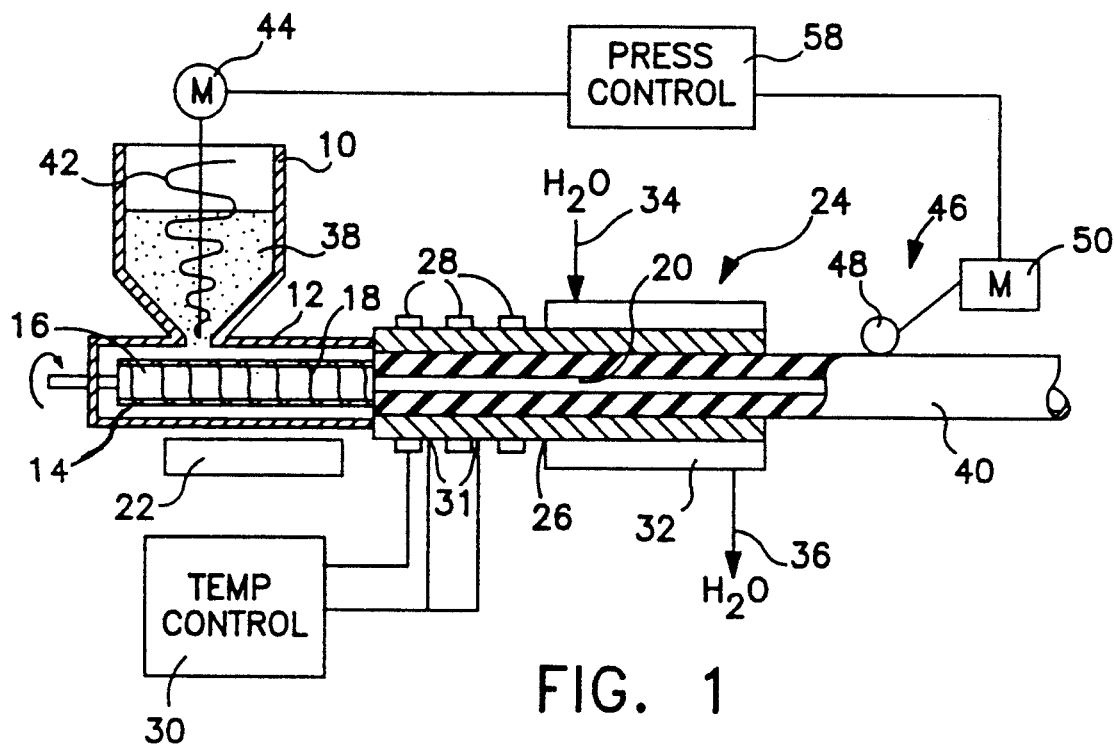
FIG. 1 is an elevational view, in partial cross-section, of extrusion apparatus in accordance with the invention.

As an example, reference may be had to FIG. 1. FIG. 1 illustrates a feed bin 10 which contains a substantially uniform feed mixture 38. This mixture is in the form of a thoroughly mixed powder comprising a thermoplastic binder material and a powdered or granular primary material such as, for example, activated carbon. This substantially uniform feed mixture will have been prepared in a suitable mixer (not shown) such as, for example, a plow mixer or ball mixer, as described in the aforementioned applications and hereinafter in this application. The feed bin 10 feeds into an extruder barrel 12 which contains a feed screw 14. The feed screw 14 comprises a solid core 16 surrounded by conventional helical flights 18. Also, in the case of producing hollow composite solid articles, a center rod 20 is attached to, and extends forward axially of, the core 16. A preheater 22 may be employed to preheat contents of the feed material 38 in the extruder barrel 12. The extruder used may be a standard design used for conventional plastics extrusion but generally having a typical length to width ratio of 10:1 and equipped with a bimetallic barrel liner to protect against highly abrasive powder or particles. The barrel is designed to withstand high pressure as may be experienced during an unanticipated excursion in operating pressure. The motor used to drive the extruder screw is typically a D.C. motor capable of 10 to 20 horsepower and is coupled to a 30-50:1 gear box.

The output end of the extruder barrel 12 feeds the input end of a die assembly 24. The die assembly 24 comprises an elongated die 26 which is characterized by an inside shape of substantially uniform cross-section throughout, which cross-section is not substantially smaller than the cross-section of the inside diameter of the extruder barrel 12. The input end of the die 26 is provided with heating elements 28 under the control of a temperature control unit 30 responsive to thermocouples 31. The output end of the die 26 is cooled by a cooling fluid jacket 32 having a cooling fluid inlet 34 and outlet 36, the cooling fluid preferably being water. The die is smooth so as to create a minimum of friction with the feed material passing through the die in order to prevent shearing of the product from ID to OD during consolidation and formation of solid product.

In the practice of this invention, the feed bin 10 is filled with a substantially uniform mixture of a powder or granular material 38 comprising particles of a relatively low softening temperature binder such as, for example, polyethylene, and particles of a higher softening temperature primary material such as, for example, activated carbon. This material is passed through the extruder barrel 12 by the feed screw 14. The use of a feed screw is especially critical to obtain an accurate and reproducible flow of powdered material, which in select cases, such as for example feed mixtures containing very small carbon powder particles, will not feed through the extruder without the assistance of a vertical feed screw or auger 42 in feed bin 10. However, an auger 42 is not required for all feed mixtures since many such feed mixtures may be fed to the extruder barrel 12 from feed bin 10 by gravity flow. The material in the extruder is preheated by the action of preheater 22. The preheated material then passes into the die 26 where it is further heated by the heating elements 28 to the required processing temperature, which is substantially above the softening temperature of the binder material but below that of the primary particles (typical readings for thermocouples 31 are 360°-400° F.). Pressure is applied to the feed material in the die 26 while simultaneously heating and it thereby coalesces into a solid mass around the center rod 20. The solid mass is immediately cooled by the passage of cooling fluid, e.g. water (typically 90°-120° F.) through the cooling jacket 32. The final composite solid product 40, in the form of a hollow cylinder, is then extruded from the die assembly 24.

A crucial feature of the present invention is the control of pressure within the die 26 by means external of the die. These means comprise a back pressure device 46 which impedes the extrusion of the composite solid product 40 from the die 26 and can also optionally additionally comprise an auger 42 in feed bin 10 under control of a motor 44 which forces the feed powder 38 into the extruder barrel 12. In the illustration of FIG. 1, the back pressure device 46 comprises a pair of rollers 48 driven, by a motor 50 in a direction opposite to the direction of the flow of product 40 from die assembly 24 and at a rate equal to the desired rate of extrusion to provide the desired back pressure. The pressure within the die 26 does not normally exceed about 400 psi and is usually less than about 200 psi. In some instances, it may even be as low as 5-10 psi to produce an acceptable composite solid product.

Figure 2:
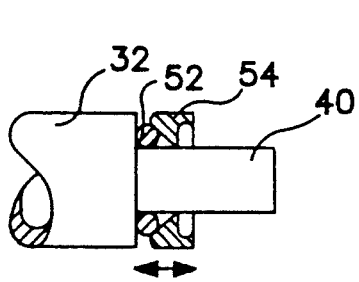
FIG. 2 is an enlarged detail of a modified back pressuring apparatus for the apparatus of FIG. 1.

It will be understood that a number of other devices may be used for controllably adjusting the back pressure externally of the extrusion die 26. One such device is illustrated in FIG. 2 as an annular rubber "doughnut" 52 which encircles the product cylinder 40 and is compressed against it such as by a controllable annular compression disc 54. In any event, the key to this invention is that the pressures and temperatures are controlled from without the die. As a result, the die itself can be very simple with typically no change in internal cross-section.

Figure 4:
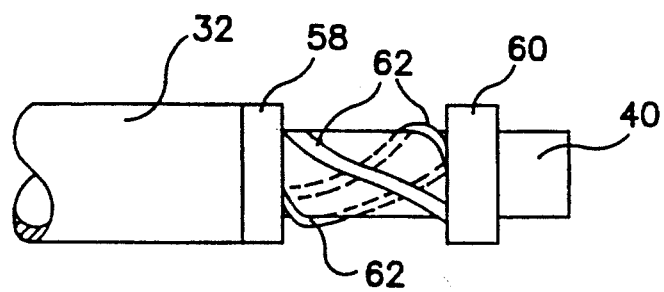
FIG. 4 is an enlarged detail of another modified back pressuring apparatus for the apparatus of FIG. 1.

Another such back pressuring device is illustrated in FIG. 4 as a series of helical rubber coils 62 which encircle the product cylinder 40 and is controllably squeezed or compressed against the product 40 by relative annular movement of anchoring plates 58 and 60. Coils 62 are typically silicone rubber tubing with opposite ends of each tube being connected to annular anchor plates 58 and 60. Anchor plate 58 is suitably attached to the cooling end 32 of die 26 in any suitable fixed manner while anchor plate 60 is free to be suitably rotated around product 40. A typical device will generally comprise three or four such tubes 62. Rotation of anchor plate 60 permits annular movement of tubes 62 to increase or decrease the pressure of the tubes upon product 40 thereby permitting ready adjustment of back pressure by increasing or decreasing the helix angle of tubes 62.

It is important that the feed material 38 entering the die 26 remain flowable. For that reason, the preheating which occurs within the extruder barrel 12 should not closely approach the softening point of the binder material. However, preheating is useful because it reduces the amount of additional heat that must be supplied within the die 26. This makes it possible to use a shorter die and to speed up the process.

Another feature of the invention is that the cross-sectional area of the die 26 cannot be substantially smaller than the free cross-sectional area of the feed screw 14. The term "free cross-sectional area" refers to the area (or volume) of supplied material as defined by the space between the core 16 and the flights 18 of the extruder screw 14, corrected for the thickness of the flights themselves. As an example, it might be possible, in the case of activated carbon primary material, to reduce the area from 4.6 square inches at the extruder outlet to 4.2 square inches at the die inlet. However, this can only be done with difficulty because there would be a tendency for the material to solidify or "freeze". However, there is no problem in expanding from the extruder into a larger cross-section die.

Figure 3:
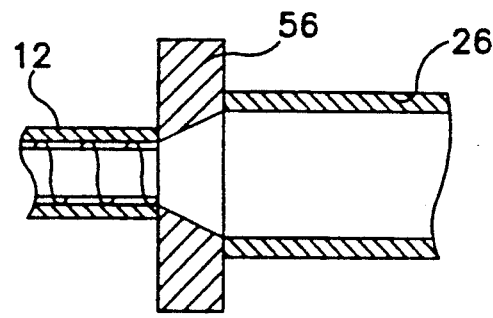
FIG. 3 is an enlarged cross-section of an expansion zone for materials injected into the die of the invention.

Expansion is illustrated in FIG. 3 wherein the extruder barrel 12 feeds into an oversized die 26 via an expansion flange 56. Obviously, to force the expansion of materials into the die 26, requires back pressure which is supplied by the back pressure device 46. As previously explained, the type of back pressure device is virtually unlimited. It may be a pair of rollers as shown in FIG. 1 controlled by a stepper motor or a D.C. brushless motor through a controller 58 or a rubber doughnut 52 as explained with respect to FIG. 2. Virtually anything may be employed as long as it provides controlled back pressure. In the case of certain activated carbon primary particles in the feed mixture, this back pressure can be very low, and need be, for example, only 5 or 10 pounds per square inch. On the other hand, it may be necessary to apply very high back pressures when producing very high density products. The back pressure required depends upon the material being produced. If too much pressure is applied, many substances, even in an absolutely smooth straight die, will undergo irreversible solidification and densification to the point where the die will actually split and explode. Thus, there is, for each material combination, an "operating window". This operating window is defined by three factors:

1. Maximum density or back pressure—each feed material used to produce a solid composite article has a maximum density and allowed pressure, after which the material will not emerge from even a smooth continuous cross-section die. Each formulation also requires a minimum back pressure to consolidate the material into a strong cohesive structure.

2. There is a minimum heat and a maximum heat—if a substance is heated insufficiently, it will not solidify and will be very prone to "locking" within the extruder die. If overheated, it will have a strong tendency to lock up within the die.

3. The heating section of the die is critical. If the heating section is too short, and the flow of material too fast, it is not possible to transmit the heat required to form a solid object and the core may not solidify. On the other hand, if the heating section is too long, the back pressure goes up uncontrollably so that the product goes into sudden and irreversible lock up to the extruder wall. Furthermore, the cooling section must be long enough that the solid article produced is cooled sufficiently to retain its structural integrity when it emerges from the die without contributing uncontrolled amounts of back pressure that can lead to material lock up.

4. Another factor to be considered relates to particle size and crush resistance of the primary material as well as the character and lubricity of the feed material. If the particle size is relatively large, the back pressure is applied against a relatively small number of particle interfaces, which will cause particle crushing. In other words, the larger the particle size, the lower the permitted pressure. Furthermore, the size and type of particles have a strong influence upon the thermal conductivity of the material and the thermal conductivity changes as the material is consolidated and densified.

Other factors to be considered in defining the operating window are the extrusion rate, the heating and cooling rate, the dimensions of the extruder screw and the extrusion die, and the intrinsic back pressure in the die due to the L:G ratio.

In the case of carbon, it is known that, if the die length is too long, this will to create a substantial intrinsic back pressure and consequent crushing of the carbon. For this reason, it is possible to use a longer die for powdered carbon than for coarse granular carbon. The important factor here is not the absolute length, but the L:G ratio, i.e. the ratio of die length L to die gap G wherein the gap is defined as $(OD-ID)/2$ and OD is the outside diameter of the article being produced (i.e. the inside diameter of the die) and ID is the inside diameter of the article being produced (i.e. the outside diameter of center rod 20). For example, with $80 \times 325$ mesh carbon, dies can be employed having L:G ratios of about 25 to 30. In the case of $20 \times 50$ mesh carbon, L:G ratios of about 20 to 25 are optimal. These are well polished die walls and center rods.

As previously explained, there are distinct limitations on the ability to compress the material into a die smaller than the extruder. However, it has been discovered that, if that is to be attempted, the compression change should occur just at the tip of the extruder's screw and the ratio of the cross-sectional area of the die mouth to the extruder output area should not be less than approximately 0.9.

The process of this invention involves the application of heat into, and thereafter sufficient pressure and shear upon, a substantially uniform mixture of a binder in the form of relatively low softening point solid resin particles, and one or more "anvil" materials comprising relatively higher melting point primary particles or fibers. The sizes of the binder particles are within the range of about 0.1 to about 250 micrometers, and are typically 5–20 micrometers, while the sizes of the primary particles are within the range of about 0.1 to about 3,000 micrometers.

In the practice of the process of this invention it is necessary to very thoroughly mix together the binder and primary particles. This is important to insure that the binder is sufficiently evenly distributed throughout the primary particles such that, upon later conversion, it will entrap or bond to substantially all of them. This will be described in detail hereinafter.

After mixing, heat is applied, preferably in the absence of any significant pressure or shear, to raise the temperature of the mixture substantially above the softening point of the binder, preferably at least about 25° C. above the softening point of the binder, but below the softening temperature of the primary material. Then, sufficient pressure and at least some finite amount of shear are applied to the heated mixture for a short period of time to cause forced point-bonding. The mixture is then rapidly cooled to a temperature below the softening point of the binder, causing the polymeric binder phase to be frozen in form.

The binder can be composed of nearly any thermoplastic material including, for example, polyolefins such as polyethylene, polypropylene, polybutene-1, and poly-4-methylpentene-1; polyvinyls such as polyvinyl chloride, polyvinyl fluoride, and polyvinylidene chloride; polyvinyl esters such as polyvinyl acetate, polyvinyl propionate, and polyvinyl pyrrolidone; polyvinyl ethers; polyvinyl sulfates; polyvinyl phosphates; polyvinyl amines; polyoxidiazoles; polytriazols; polycarbodiimides; copolymers and block interpolymers such as ethylene-vinyl acetate copolymers; polysulfones; polycarbonates; polyethers such as polyethylene oxide, polymethylene oxide, and polypropylene oxide; polyarylene oxides; polyesters, including polyarylates such as polyethylene terphthalate, polyimides, and variations on these and other polymers having substituted groups such as hydroxyl, halogen, lower alkyl groups, lower alkoxy groups, monocyclic aryl groups, and the like and other thermoplastic meltable solid materials. Especially preferred as a binder is polyethylene, particularly grade 510 polyethylene from the USI Division of Quantum Chemical Corporation.

Materials that can serve as primary particles in the process of this invention can include metallic particles of 410, 304 and 316 stainless steel, copper, aluminum and nickel powders, ferromagnetic materials, activated alumina, activated carbon, silica gel, acrylic powders and fibers, glass beads, various abrasives, common minerals such as silica, ion-exchange resins, ceramics, zeolites, diatomaceous earth, polyester particles and fibers, and particles of engineering resins such as polycarbonate. Especially preferred are particles of activated carbon for producing composite filter elements.

One of the requirements for the production of strong and uniform structures using the process described herein is the formation of a stable substantially uniform feed mixture of binder and primary particles prior to processing. It has been generally found that the methods used to produce this uniform mixture and the characteristics of the particles used in the process must produce a mixture where binder particles assume a stable attachment to the primary particles. Binder attachment to the primary particles can result in the stabilization of mixtures of primary particles that would normally segregate as a result of differences in density or particle morphology. Preferably, the binder material has a slight inherent tackiness or artificial tackiness is created by the addition to the mixer of a tackifier.

It has often been found that binder particles produced by emulsion polymerization have a performance in the process of this invention which is superior to particles produced by alternative methods. For example, particles of polyethylene resins produced by emulsion polymerization are effective in the process but particles produced by grinding are usually not effective.

The formation of stable substantially uniform feed mixtures under the unique conditions of high intensity mixing and surface treatment described herein allows mixtures of particles to be handled that usually undergo severe separation or segregation because of differences in density, particle morphology, or size. For example, stable mixtures can be produced between particles having densities that differ by more than a factor of ten. Smooth spherical particles can be mixed with particles having a fibrous or substantially nonspherical character. Particles whose size varies by a factor of 1,000 can be mixed and maintained as stable mixtures.

Low-shear mixing, such as within a ribbon blender or conventional ball mill, is insufficient to produce a stable mixture of binder and primary particles within a reasonable amount of time. Without the production of a specific structure during mixing, the process is generally ineffective and cohesive and strong structures cannot be produced by the process. Not only must the binder particle or primary particle have specific characteristics, such as those produced by the presence of surface active agents, but mixing must be sufficiently violent to produce a condition where binder particles and primary particles have formed stable attachments. These "prebonds" are sufficient to produce microaggregates that substantially alter the flow and dusting characteristics of the particles within the mixture. Violent mixing is also required to break apart binder particle aggregates that are often quite stable and to force reattachment of these binder particles to the primary particles.

Correct methods of mixing produce a material composed of microaggregates of primary particles and binder particles, and these aggregates have a reduced tendency to release dust when handled. An experienced operator can also readily notice a reduction in the flow characteristics of the powder mixture that indicates the formation of the desired bonds between particles. Samples smeared on a black surface show no residual binder aggregates which would be indicated by the presence of small white streaks.

Poorly mixed material, or use of binder or primary particles lacking the ability to form stable "prebonds", results in mixtures where binder and primary particles separate, or where primary particles of widely varying density or morphology separate because stable aggregates have not been formed. It is these stable aggregates, formed during mixing, that allow this process to bond particles that cannot normally be maintained in a stable mixture. It appears that, as a rule, the process is generally not workable with poorly mixed materials or with materials in which the binder particles have not become attached to the primary particles during the mixing step.

It has been found that adequate mixing can be accomplished if a ball mill is modified to have one or more (usually two) sets of steel rods placed along its periphery. The balls rotating within the mill are lifted by one set of steel rods and allowed to drop down upon the powder that has accumulated upon the surface of a second set of steel rods. The rods work well when they are threaded such that the powder is smashed between the threads of the rods and the falling balls. This action substantially amplifies the violence of the ball mill's action and within a short period of time (usually less than three hours) will produce the required microaggregated mixture.

To economically mix larger volumes of material, a conventional ribbon blender can be modified to use a series of high shear plows that press and shear over a period of time. High loading rates are required to obtain good mixing in such systems and partial loads of powder can often not be mixed effectively.

The resulting mixture, once all particles and components have been substantially uniformly dispersed, is then processed in accordance with this invention.

The process can be carried out in a modified 20 conventional screw extruder capable of providing high working pressures of up to about 6,000–20,000 psi (421.86–1406.2 kg/cm$^2$).

The extruder is normally modified to operate a smaller diameter screw within a barrel normally sized for a larger screw, e.g. operating a 2.5 inch (6.4 cm) screw within the thick barrel designed to withstand high pressures that may occur. The screw will generally have an auger-like design. The barrel of the extruder is modified to operate at ambient room temperature or to provide mild preheating up to about 170° F. (78° C.) or less and the powder is transported through the barrel at a temperature below the softening point of the binder resin. Heat resulting from friction within the barrel can, if desired, be removed by the circulation of coolant through both the screw and barrel.

The die used for the extrusion of the feed materials has been generally described hereinbefore. In the first section of the die, the walls of the die are intensely heated to heat the feed mixture to a temperature substantially above (generally at least about 25° C. above) the softening temperature of the binder material in the mixture but to a temperature less than the softening temperature of the primary material in the mixture. The mixture consolidates into the desired shape of the elements being formed. If desired the heating zone can be formed into two or more heating zones of different temperatures. The temperature is usually about 25°-100° C. above the binder polymer's melting point. As the feed mixture leaves the extruder screw and enters the die 26, back pressure device 46 provides suitable back pressure, as determined by the factors constituting the operating window, to cause the material to consolidate in the die. At the beginning of the extrusion process it may be necessary to employ a plug at the exit of the die to force the powder to consolidate. Thereafter, back pressure device 46 provides the necessary back pressure for consolidation of the material and forming of the product.

In the second die section the formed product is intensively cooled and the cooled shaped extruded product emerges from this section of the die. Cooling of the immobilized shape must be accomplished rapidly and immediately.

The die design and operating conditions must be adjusted exactingly to obtain a product with the desired final density which, in the case of activated carbon filters, is generally within the range of 0.57 to 0.85 gm/cm$^3$. However, it is usually possible to maintain density within a narrow ±0.005 gm/cm$^3$ window, once conditions are suitably adjusted. The uniformity of the product is therefore better than that obtained by any other known process.

The operating conditions chosen for extruding a hollow cylinder of activated carbon in a forced point-bonded structure having an outside diameter of 2.40 inches (6.1 cm) and an inside diameter of 0.75 inch (1.9 cm) must meet all of the following criteria:

1. Heating rate must be balanced to obtain complete heating of the carbon during its passage through the die and to consolidate the powder to the core of the extruded profile;

2. Cooling rate in the cooling section of the die must be sufficient to harden the structure prior to its emergence from the die;

3. The back pressure means for providing suitable back pressure in the die serves the purpose of consolidating the exterior surface of the carbon cylinder and provides a uniform, smooth, and low attrition surface to the cylinder. The back pressure employed is that required to obtain the desired density.

The shaped product that emerges from the extruder die follows the tolerances of the die very closely and, when processing very fine powders, the exterior walls of the product can be very smooth, as defined by the surface of the die. The resulting extruded product is normally composed of a material similar to extremely hard rubber or brittle ceramic and can usually be easily cut to length with a knife or shear, especially if the cutting surface is heated.

With the process of this invention it has become possible to extrude products from substantially uniform compositions (mixtures) of materials not thought heretofore possible. For example, it is now possible to extrude activated carbon filter elements from the following three described compositions.

An activated carbon sleeve, having a density of about 0.68 gm/cm$^3$, for use as a sleeve around a folded paper lube oil filter, can be extruded by a process according to this invention from a composition comprising:
a) about 50% to about 70% by weight activated carbon particles;
b) about 27.5% to about 37.5% by weight automobile engine lubricating oil;
c) about 4.0% to about 22.5% by weight binder particles having diameter of from about 0.1 to about 250 micrometers and optionally
d) up to about 3% by weight solid state lubricant, and preferably from a composition comprising:
a) about 58% by weight of activated carbon particle of mesh size about 12×40;
b) about 35% by weight of automotive engine lubricating oil;
c) about 5% by weight nylon binder particles of about −60 mesh, and
d) about 2% by weight sodium stearate.

Similarly, an extruded activated carbon filter useful as a high performance water filter element which remove sediment, chlorine, taste, odor, volatile organic compounds, heavy metals such as lead, hydrogen sulfide and soluble metal components, and having a density of about 0.84 gm/cm$^3$ can be extruded by a process according to this invention from a composition comprising:
a) about 20% to about 60% by weight activated carbon particles;
b) about 27.5% to about 65% by weight micronized manganese dioxide particles of at least about −100 mesh size, and
c) about 12.5% to about 22.5% by weight binder particles having diameters between about 0.1 and about 250 micrometers,
and preferably from a composition comprising:
a) about 45% by weight activated carbon particles of a mesh size of about 50×200;
b) about 40% by weight of micronized manganese dioxide, and
c) about 15% by weight polyethylene binder particles, or preferably a composition comprising:
a) about 30% by weight activated carbon particles of a mesh size of about 50×200;
b) about 55% by weight of micronized manganese dioxide, and
c) about 15% by weight polyethylene binder particles.

Likewise, an extruded activated carbon filter for general water purification use and having a density of about 0.66 to about 0.68 gm/cm$^3$ can be extruded by a process according to this invention from a composition comprising:
a) about 80% to about 88.5% by weight activated carbon particles;
b) about 12.5% to about 20% by weight binder particles having diameters between about 0.1 and about 250 micrometers,
and particularly from a composition comprising:
a) about 65% by weight 20×50 mesh activated carbon particles and about 20% by weight 80×325 mesh activated carbon particles, and
b) about 15% by weight polyethylene binder particles.

The invention is illustrated by but not limited to the following examples of the extrusion of activated carbon filter elements.

EXAMPLE 1

A feed mixture of 55% by weight Barnaby Sutcliffe coconut shell activated carbon 50×200 mesh particles, 30% by weight micronized MnO2 −400 mesh particles and 15% by weight 510 grade polyethylene binder particles (USI Division of Quantum Chemical Corporation) was mixed in a 600 lb lot in a plow mixer (S. Howes, Silver Creek, N.Y.) for about five hours until a substantially uniform stable aggregated mixture was obtained. The mixture was than feed into an extruder. The auger style extruder screw 2.5" OD, 1.25" root was rotated at 3 rpm. The extruder barrel was maintained at ambient room temperature, about 20° C., while the first die heating zone was maintained at 340° F. (173° C.) and the second die heating zone at 380° F. (194° C.) and the cooling zone at 95° F. (44° C). The die was a 4140 stainless steel die 2.5" OD, 18" overall length, with each heating and cooling zones being 6" in length. The extruder screw was equipped with a 1.25" diameter, smooth, 4140 stainless steel center rod screwed into the tip of the screw, with the center rod extending into the center of the die so that a 2.5" OD, 1.25" ID cylindrical filter element is extruded. A doughnut type back pressure device, as previously described, was employed to provide sufficient back pressure to consolidate the feed mixture into the product, with the product being produced at a rate of about 2" per minute and having a density of about 0.84 gm/cm³.

EXAMPLE 2

A feed mixture of 15% by weight −60 mesh nylon 11 particles, 58% by weight APC activated carbon 12×40 mesh particles, 35% by weight viscous high weight SAE 30 automotive lube oil and 2% by weight sodium stearate was intensively mixed in a plow mixer for about 30 minutes until a substantially uniform feed mixture was obtained. If desired, the viscous lube oil component may include additives such as, for example, an alkaline earth oxide to neutralize acids in the lube oil being filtered by the extruded product. The mixture was then feed into an extruder. The auger style extruder screw, 2.8" OD, 2.0" root, was rotated at 3 rpm. The extruder barrel was maintained at ambient room temperature, about 20° C., while the single heat zone of the die was maintained at 500° F. (260° C.) and the cooling zone at 95° F. (44° C.). The die was a 4140 stainless steel die 2.8" OD, 9" overall length, the heating zone being 6" and the cooling zone 3". The extruder screw was equipped with a 2.0" diameter, smooth, 4140 stainless steel center rod screwed into the tip of the screw and extending through the center of the die so that a 2.8" OD, 2.0" ID cylindrical filter element is extruded. A doughnut type back pressure device, as previously described, was employed to provide sufficient back pressure of about 10 psi to consolidate the feed mixture into the desired product without crushing the carbon particles. The product is produced at a rate of about 1" per minute and has a density of about 0.68 gm/cm³.

EXAMPLE 3

A 2000 lb lot of a feed mixture of 65% by weight TOG grade 20×50 mesh activated carbon particles, 20% by weight TOG grade 80×325 mesh activated carbon particles (Calgon Carbon Corp., Pittsburg, Pa.), and 15% by weight 510 grade polyethylene binder particles (USI Division of Quantum Chemical Corporation) was placed into an unjacketed plow mixer (S. Howes, Silver Creek, N.Y.) and vigorously mixed for about 8 hours, to cause slight heating of the content, until a substantially uniform feed mixture was obtained. The mixture was then feed to an extruder. The auger style extruder screw 2.5" OD, 1.25" root, was rotated at 3 to 4 rpm. The extruder barrel was heated to 140° F. (61° C.), the first die heat zone to 340° F. (172° C.), the second die heat zone to 380° F. (194° C.) and the die cooling zone to 94° F. (44° C.). The die was a 4140 stainless steel die 2.5" OD, 18" overall length, each heating and cooling zones being 6" in length. The extruder screw was equipped with a 1.25" diameter, smooth, 4140 stainless steel center rod screwed into the tip of the screw and extending through the center of the die so that a 2.5" OD, 1.25" ID cylindrical filter element is formed. A doughnut type back pressure device, as described hereinbefore, was employed to provide sufficient back pressure to consolidate the feed mixture into the desired product having a density of about 0.66 to 0.68 gm/cm³ and to produce said extruded product at the rate of about 2.5 to 3.0" per minute.

With the foregoing description of the invention, those skilled in the art will appreciate that modifications may be made to the invention without departing from the spirit thereof. Therefore, it is not intended that the scope of the invention be limited to the specific embodiments illustrated and described.

I claim:

1. An extruded composite solid article formed by extrusion of an extrudable composition comprising a substantially uniform mixture of:
   a) about 50% to about 70% by weight activated carbon particles as powdered or granular primary particles having a diameter of from about 0.1 to about 3000 micrometers;
   b) about 27.5% to about 37.5% by weight lubricating oil;
   c) about 4.0% to about 22.5% by weight thermoplastic binder particles having a diameter of from about 0.1 to about 250 micrometers and optionally
   d) up to about 3% by weight solid state lubricant, and
   wherein said activated carbon particles have a softening temperature at least about 25° C. above the softening temperature of the binder particles.

2. An extruded composite solid article of claim 1 which is a filter element formed from a composition comprising a substantially uniform mixture of:
   a) about 58% by weight of activated carbon particle of mesh size about 12×40;
   b) about 35% by weight lubricating oil;
   c) about 5% by weight nylon binder particles of about −60 mesh size, and
   d) about 2% by weight sodium stearate.

3. An extruded composite solid article formed by extrusion of an extrudable composition comprising a substantially uniform mixture of:
   a) about 20 to about 60% by weight activated carbon particles; and
   b) about 27.5% to about 65% by weight micronized manganese dioxide particles of at least about −100 mesh size
   as powdered or granular primary particles having a diameter of from about 0.1 to about 3000 micrometers, and
   c) about 12.5% to about 22.5% by weight thermoplastic binder particles having diameters between about 0.1 and about 250 micrometers, and wherein said activated carbon particles have a softening temperature at least about 25° C. above the softening temperature of the binder particles.

4. An extruded composite solid article of claim 3 which is a filter element formed from a composition comprising a substantially uniform mixture of:
   a) about 45% by weight activated carbon particles of a mesh size of about 50×200;
   b) about 40% by weight of micronized manganese dioxide, and
   c) about 15% by weight polyethylene binder particles.

5. An extruded composite solid article of claim 3 which is a filter element formed from a composition comprising a substantially uniform mixture of:
   a) about 30% by weight activated carbon particles of a mesh size of about 50×200;
   b) about 55% by weight of micronized manganese dioxide, and
   c) about 15% by weight polyethylene binder particles.

6. An extruded composite solid article formed by extrusion of an extrudable composition comprising a substantially uniform mixture of:
   a) about 80% to about 88.5% by weight activated carbon particles as powdered or granular primary particles having a diameter of from about 0.1 to about 3000 micrometers; and
   b) about 12.5% to about 20% by weight binder particles having diameters between about 0.1 and about 250 micrometers, and
wherein said activated carbon particles have a softening temperature at least about 25° C. above the softening temperature of the binder particles.

7. An extruded composite solid article of claim 6 which is a filter element formed from a composition comprising a substantially uniform mixture of:
   a) about 65% by weight of 20×50 mesh activated carbon particles and about 20% by weight 80×325 mesh activated carbon particles, and
   b) about 15% by weight polyethylene binder particles.

8. A composition comprising a substantially uniform mixture of:
   a) about 50% to about 70% by weight activated carbon particles as powdered or granular primary particles having a diameter of from about 0.1 to about 3000 micrometers;
   b) about 27.5% to about 37.5% by weight lubricating oil;
   c) about 4.0% to about 22.5% by weight thermoplastic binder particles having diameter of from about 0.1 to about 250 micrometers and optionally
   d) up to about 3% by weight solid state lubricant, and
wherein said activated carbon particles have a softening temperature at least about 25° C. above the softening temperature of the binder particles.

9. A composition of claim 8 comprising a substantially uniform mixture of:
   a) about 58% by weight activated carbon particle of mesh size about 12×40;
   b) about 35% by weight lubricating oil;
   c) about 5% by weight nylon binder particles of about −60 mesh size, and
   d) about 2% by weight sodium stearate.

10. A composition of claim 8 comprising a substantially uniform mixture of:
   a) about 20 to about 60% by weight activated carbon particles and;
   b) about 27.5% to about 65% by weight micronized manganese dioxide particles of at least about −100 mesh size
as powdered or granular primary particles having a diameter of from about 0.1 to about 3000 micrometers, and
   c) about 12.5% to about 22.5% by weight thermoplastic binder particles having diameters between about 0.1 and about 250 micrometers, and
wherein said activated carbon particles have a softening temperature at least about 25° C. above the softening temperature of the binder particles.

11. A composition of claim 10 comprising a substantially uniform mixture of:
   a) about 45% by weight activated carbon particles of a mesh size of about 50×200;
   b) about 40% by weight of micronized manganese dioxide, and
   c) about 15% by weight polyethylene binder particles.

12. A composition of claim 10 comprising a substantially uniform mixture of:
   a) about 30% by weight activated carbon particles of a mesh size of about 50×200;
   b) about 55% by weight of micronized manganese dioxide,
   c) about 15% by weight polyethylene binder particles.

13. A composition comprising a substantially uniform mixture of:
   a) about 80% to about 88.5% by weight activated carbon particles as powdered or granular primary particles having a diameter of from about 0.1 to about 3000 micrometers; and
   b) about 12.5% to about 20% by weight thermoplastic binder particles having diameters between about 0.1 and about 250 micrometers, and
wherein said activated carbon particles have a softening temperature at least about 25° C. above the softening temperature of the binder particles.

14. A composition of claim 13 comprising a substantially uniform mixture of:
   a) about 65% by weight 20×50 mesh activated carbon particles and about 20% by weight 80×325 mesh activated carbon particles, and
   b) about 15% by weight polyethylene binder particles.

* * * * *